United States Patent [19]

Hübschmann

[11] 4,036,112
[45] July 19, 1977

[54] ROLLING DIAPHRAGM SEALING DEVICES

[75] Inventor: Karl-Wolfgang Hübschmann, Langweid, Germany

[73] Assignee: Motoren-Werke Mannheim AG, Mannheim, Germany

[21] Appl. No.: 592,073

[22] Filed: June 30, 1975

[30] Foreign Application Priority Data

July 2, 1974 Germany .............................. 2431745

[51] Int. Cl.² ............................................. F15B 21/04
[52] U.S. Cl. ....................................... 92/80; 92/82; 92/83; 92/86; 92/98 D
[58] Field of Search .............. 92/80, 82, 83, 86, 98 D, 92/105

[56] References Cited

U.S. PATENT DOCUMENTS

| 2,692,618 | 10/1954 | Ludowici | 92/98 D |
| 3,302,392 | 2/1967 | Fokker | 92/83 |
| 3,327,633 | 6/1967 | Duinker | 92/98 D |
| 3,339,464 | 9/1967 | Rietdijk | 92/98 D |
| 3,547,005 | 12/1970 | Van der Aa | 92/83 |
| 3,667,348 | 6/1972 | Neelen | 92/83 |
| 3,783,745 | 1/1974 | Meijer | 92/83 |
| 3,869,963 | 3/1975 | Schindel | 92/86 |

FOREIGN PATENT DOCUMENTS

1,962,245 7/1970 Germany .............................. 92/98 D

*Primary Examiner*—Martin P. Schwadron
*Assistant Examiner*—Abraham Hershkovitz

[57] ABSTRACT

A sealing device between a reciprocator and a stationary encircling housing comprises first and second rolling diaphragms at opposite ends of the reciprocator and exposed to higher and lower pressures, respectively, diaphragm-supporting liquid in first and second chambers in the respective diaphragms, and pumping means which, owing to the reciprocation, pumps liquid from the second chamber to the first. This means comprises an annular seal carried by the reciprocator, sliding on the housing and acting as a piston and as an inlet non-return valve, and another annular seal carried by the housing, sliding on the reciprocator and acting as an outlet non-return valve.

7 Claims, 9 Drawing Figures

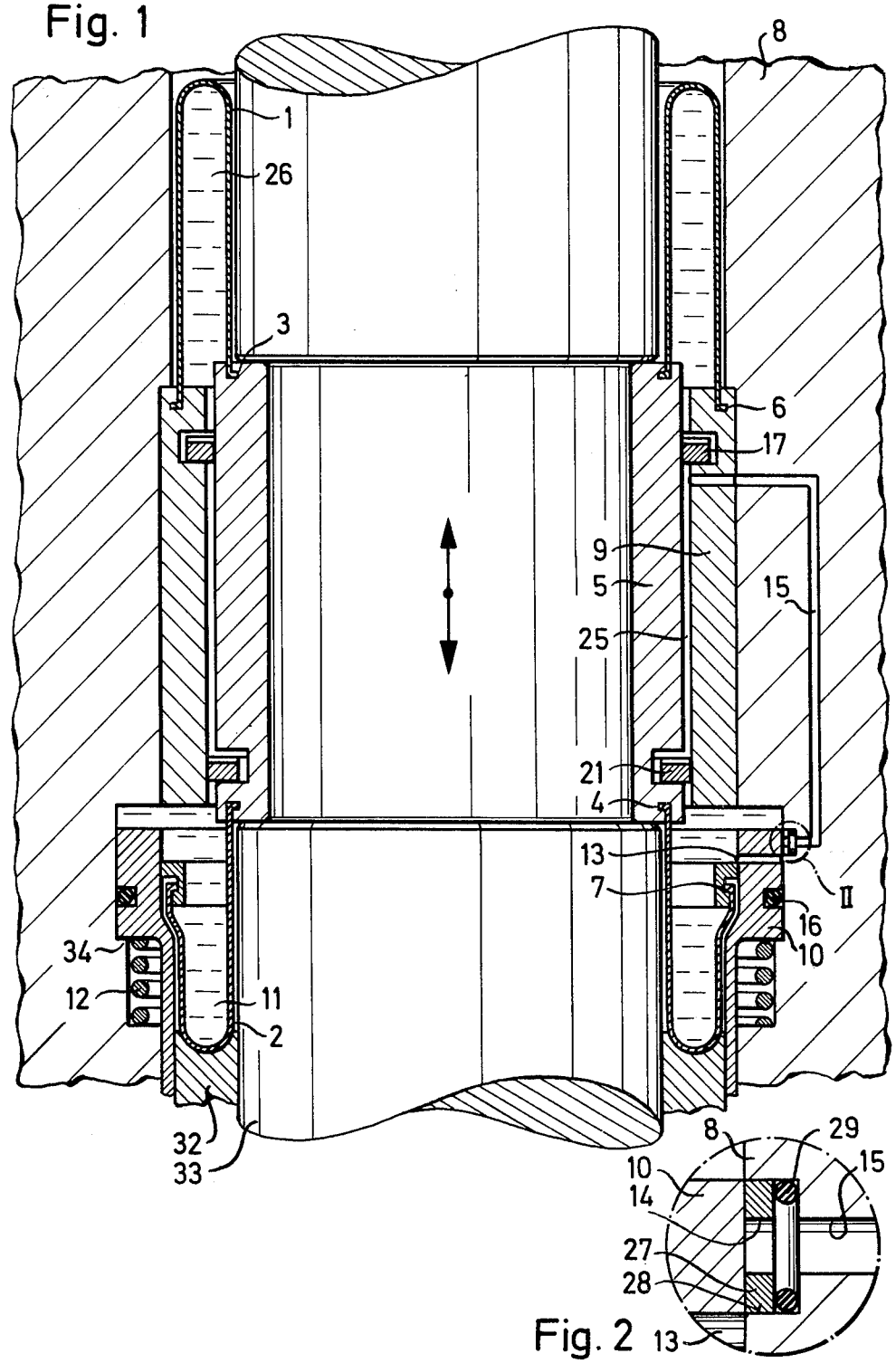

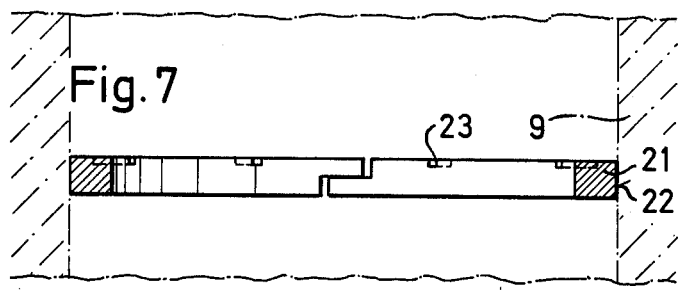
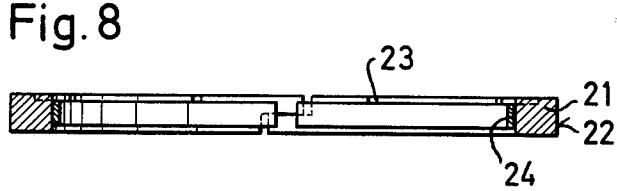
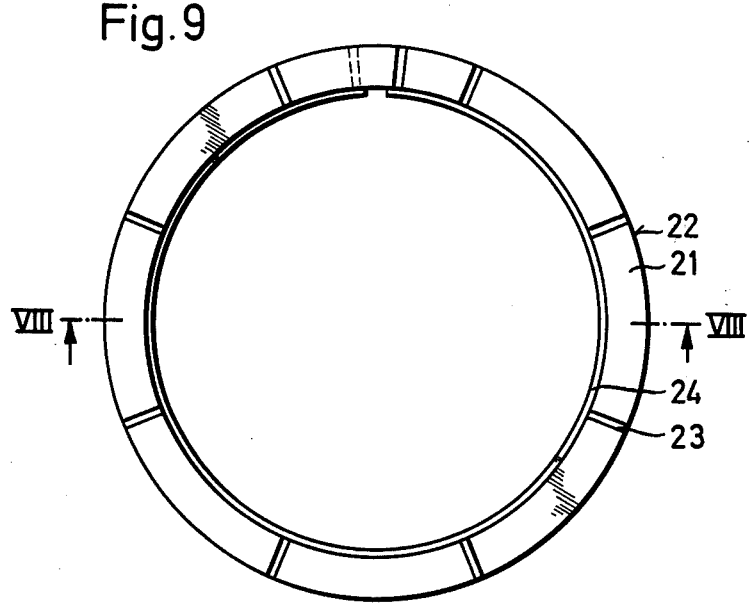

ROLLING DIAPHRAGM SEALING DEVICES

BACKGROUND OF THE INVENTION

1. Field of the Invention

This invention relates to a rolling diaphragm sealing device between the wall of a housing bore and an internal part, with one of the part and the housing being reciprocable relative to the other.

2. Description of the Prior Art

It is known to provide a rolling diaphragm sealing device between the wall of a housing bore and an internal part which reciprocates relatively to the wall. The sealing device comprises two rolling diaphragms whereof the annular mouths open towards each other and whereof the internal annular edges are secured to the internal part and the external annular edges to the housing in a fluid-tight manner, each rolling diaphragm bounding an annular chamber filled with a supporting liquid and closed by an annular seal. Each seal has a sealing effect in only one direction of reciprocation and is associated with a sealing surface which slides thereon when the internal part reciprocates. A rolling diaphragm sealing device of this kind is shown and described in German Patent Specification No. 1,080,366, for example.

If a rolling diaphragm sealing device of this kind were to be subjected to pressure unilaterally, more particularly high pressure, the liquid would be displaced from the loaded chamber by way of unavoidable leaks in the associated annular seal into the non-loaded chamber, which would have the result that the rolling diaphragm remote from the pressure would be over-expanded and finally destroyed, that is to say the known rolling diaphragm sealing device is not suitable for unilateral high pressure loading.

SUMMARY OF THE INVENTION

According to the present invention, there is provided in combination,
  an internal part;
  a housing defining a bore receiving said internal part, one of said internal part and said housing being reciprocable relative to the other longitudinally of said bore;
  a first annular rolling sealing diaphragm having external and internal annular edges respectively connected in a fluid-tight manner to said housing and to said internal part;
  a second annular rolling sealing diaphragm having external and internal annular edges respectively connected in a fluid-tight manner to said housing and to said internal part, the diaphragms having respective annular mouths which open towards each other;
  portions of the first diaphragm bounding a first annular chamber for receiving a diaphragm-supporting liquid to support said first diaphragm against a relatively high pressure in said bore;
  portions of the second diaphragm bounding a second annular chamber for receiving a diaphragm-supporting liquid to support said second diaphragm against a relatively low pressure in said bore;
  and pumping means operable by the relative reciprocation between said internal part and said housing to pump liquid from said second chamber to said first chamber to compensate for leakage losses from said first chamber.

Owing to the invention, it is possible to provide an hermetic sealing device for parts such as pistons and pistons rods, which is suitable for high pressure differentials.

Advantageously, the pumping means comprises two annular seals between the internal part and the housing and so arranged that on reciprocation of the internal part a pumping effect is obtained which brings liquid from the second chamber into the first chamber, the supply of liquid to the first chamber being so regulated that it only compensates for leakage losses from the first chamber.

The advantage is obtained that the pumping means is situated inside the sealed volume including the two chambers, and does not require any control intervention from outside that volume.

Those parts of the pumping means which slide on one another can be satisfactorily lubricated and therefore operate without much wear and thus without any operating disturbances, since lubricating oil can be used as the supporting liquid.

Advantageously, the supply of liquid into the first chamber is regulated by a control sleeve which is displaceable in a bore of a casing included in the housing and which is subjected to the pressure in the second chamber and to an opposing force of a biassing spring, the control sleeve, when the pressure in the second chamber falls below a specific desired value, being displaced by the spring into a position in which it provides a transfer path from the pumping chamber to the second chamber, the transfer path being closed when upon the desired pressure value being reached in the second chamber, the control sleeve moves into a closing position under the action of this pressure.

This regulating arrangement has the advantage of requiring relatively little space radially, which may be important when sealing piston rods, for example.

Under unilateral pressure loading in the stationary condition, the pressure in the loaded first chamber is propagated, by way of leaks, into the non-loaded second chamber, since the pumping action has ceased. The second diaphragm is protected from damage in this condition by arranging for it to be surrounded at its entire outer surface, by wall portions when in its axially outer end position. In order that this supporting effect can be obtained also in other positions of the internal part, the second diaphragm needs to be capable of stretching to such an extent that it can be pressed by the now greatly increased pressure in the second chamber onto the wall portions, without tearing. Since this considerable stretching occurs only in the stationary condition and for the first few strokes of the internal part on resumption of reciprocation, it can be tolerated by the diaphragm.

Conveniently, pressure which occurs in the second chamber produces a force acting on the control sleeve in that the second diaphragm is secured at its external annular edge to the control sleeve and at its internal annular edge to the internal part, in a fluid-tight manner in both cases.

This arrangement avoids requiring additional space radially.

Escape of supporting liquid by way of the external periphery of the control sleeve in the stationary condition is advantageously prevented in that the control sleeve is pressed with a sealing action onto a shoulder of the casing when the pressure in the second chamber exceeds the desired value.

In this way hermetic sealing is obtained in the stationary state.

In an alternative advantageous way of regulating the liquid supply to the second chamber a barometer cell or aneroid capsule subjected to the pressure in the second chamber controls a return flow regulating valve which regulates a transfer path between the second chamber and the pumping chamber. When the pressure in the second chamber drops below a specific desired value the barometer cell under the influence of its own spring arrangement opens the valve. The cell closes the valve under the action of the pressure in the second chamber as soon as this pressure has reached its desired value.

This arrangement has the advantage that the supporting liquid flow system can be hermetically sealed permanently relative to the ambient atmosphere.

BRIEF DESCRIPTION OF THE DRAWINGS

In order that the invention may be clearly understood and readily carried into effect, reference will now be made, by way of example, to the accompanying drawings, in which:

FIG. 1 shows a vertical axial section through a rolling diaphragm sealing device, FIG. 2 shows a detail of FIG. 1, FIG. 7 shows a vertical axial section through another annular seal of the device of FIG. 1 or 3, FIG. 8 shows a vertical axial section through a modified version of this other seal, and FIG. 9 shows a plan half view of the seal shown in FIG. 8.

DESCRIPTION OF THE PREFERRED EMBODIMENTS

Figure 4:
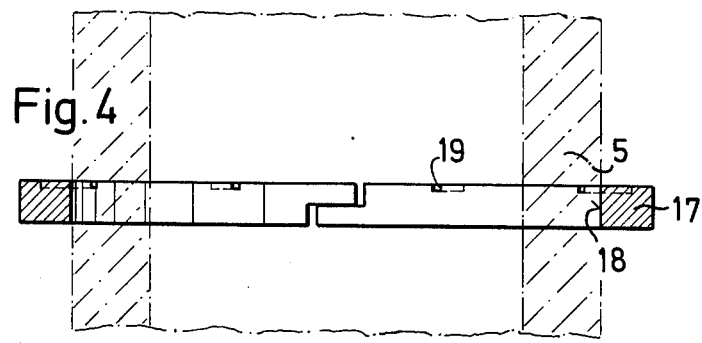
FIG. 4 shows a vertical axial section through an annular seal of the device of FIG. 1 or 3.
Figure 5:
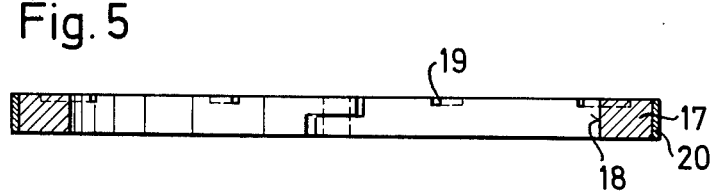
FIG. 5 shows a vertical axial section through a modified version of the seal.
Figure 6:
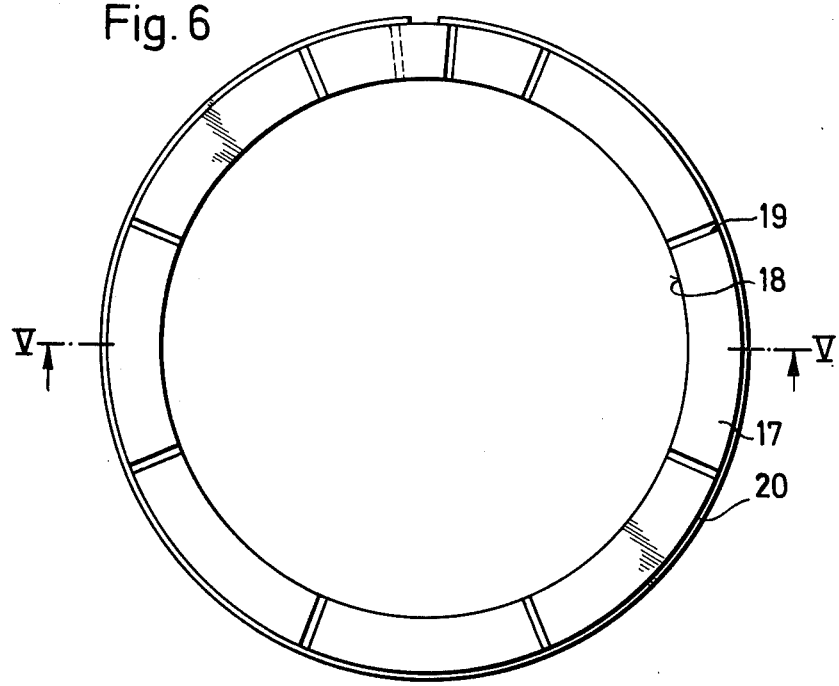
FIG. 6 shows a plan half view of the seal shown in FIG. 5.

Referring to the drawings, the rolling diaphragm sealing device includes annular rolling sealing diaphragms 1 and 2 whereof the annular mouths open towards each other and whereof the internal annular edges 3 and 4 are secured in a fluid-tight manner on a part 5 of a piston rod 33 and whereof the external annular edges 6 and 7 are secured in a fluid-tight manner on substantially stationary housing parts 9 and 10. The external edge 6 of the diaphragm 1 is secured on a sleeve 9 which has been press-fitted into a casing 8 of the housing and which in this region defines the wall of a bore in the housing receiving the internal part 5. In the embodiment of FIG. 1, the external edge 7 is secured on a control sleeve 10 which is displaceable along a bore in the casing 8. The control sleeve 10 is subjected to the relatively low pressure in a chamber 11, which pressure tends to displace it downwards. A spring 12 acts upwardly on the sleeve 10, tending to bring a control passage 13 into register with a valve port 14 of a return duct 15. The external periphery of the control sleeve 10 is sealed relative to the casing 8 with the aid of an O-ring 16. An annular sleeve 17 is situated with some play in a groove in the sleeve 9, so that it presses with its internal peripheral surface 18 under the action of its own elasticity against the external periphery of the internal part 5. Radial slots 19 (see FIG. 4) are provided in one axial end face of the seal 17. The pressing of the surface 18 against the internal part 5 can instead be effected by the action of a clamping ring 20 (see FIGS. 5 and 6) if the material of the seal 7 is not itself of an elastic nature. In a groove of the internal part 5 there is situated with some play an annular seal 21 which presses under the action of its own elasticity with its external peripheral surface 22 against the bore wall of the sleeve 9. Radial slots 23 (FIG. 7) are formed in one end face of the seal 21. The seal 21 can also instead press under the action of a clamping ring 24 (FIGS. 8 and 9) if the material of the seal 21 does not have elasticity of its own. The seals 17 and 21, the internal part 5, and the bore wall of the sleeve 9 define a pumping chamber 25 of which the volume varies synchronously with the reciprocating of the internal part 5. At the upward stroke of the internal part 5, liquid can be pumped from the pumping chamber 25 by way of the lateral clearance and the slots 19 of the seal 17 into the loaded chamber 26. At the downward stroke of the internal part 5, liquid can flow out of the chamber 11 by way of the lateral clearance and the slots 23 of the seal 21 into the pumping chamber 25. In the opposite direction both seals 17 and 21 block the flow of liquid except for unavoidable leakages. The valve port 14 of the duct 15 is encircled by a valve ring 27 which is pressed sealingly against the control sleeve 10 by the pressure in the duct 15. The valve ring 27 is situated in a cylindrical recess 28 in the casing 8 and is pressed against the control sleeve 10 at its outer periphery by an O-ring 29 situated between the valve ring 27 and the base of the recess 28.

Figure 3:
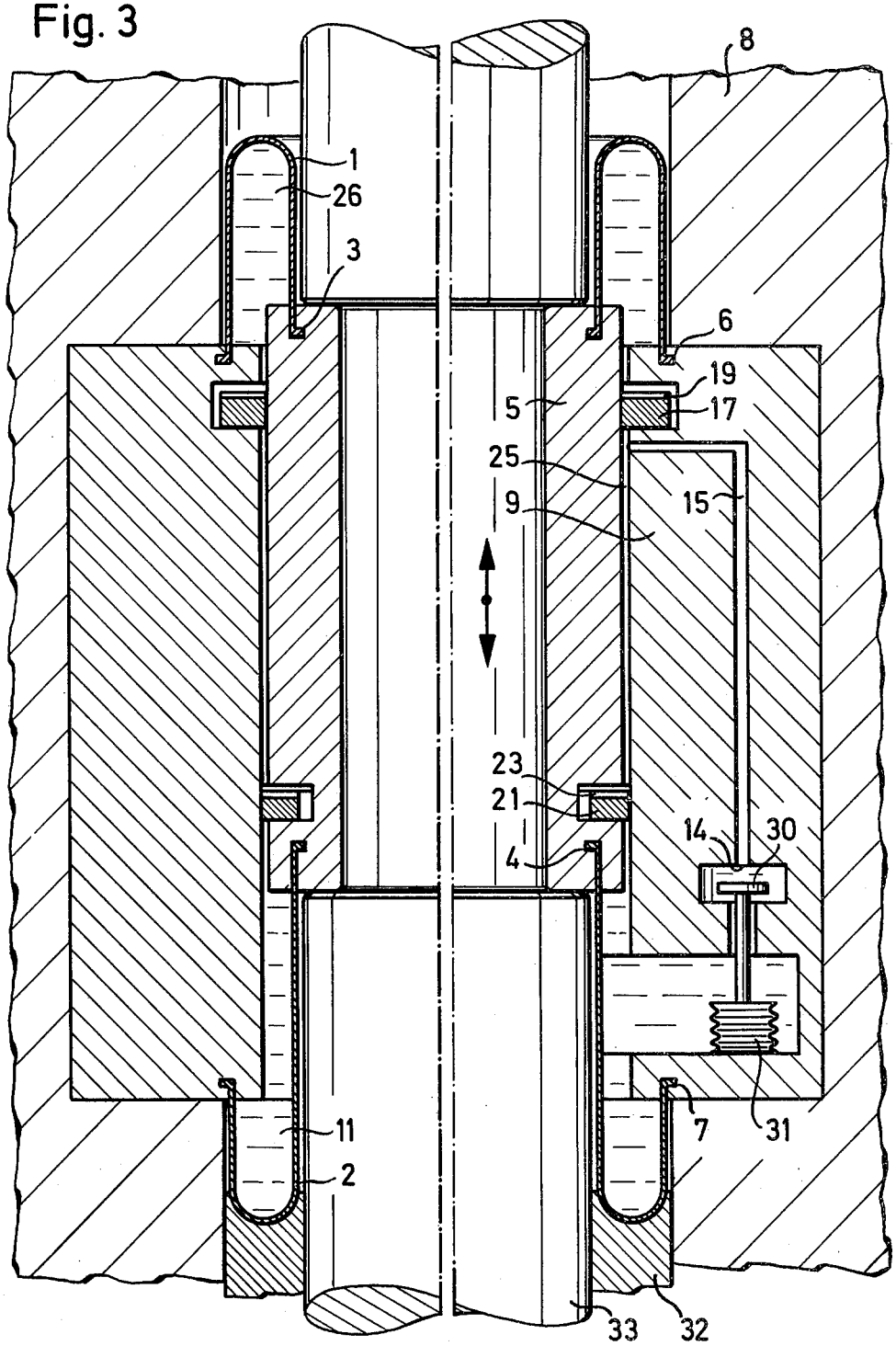
FIG. 3 shows a vertical axial section through a modified version of the sealing device.

In the embodiment shown in FIG. 3 the valve port 14 of the duct 15 is opened and closed by a valve closure member 30 under the action of a barometer cell 31 exposed to the pressure in the non-loaded chamber 11.

In the axially outer end position of the diaphragm 2, i.e. the lower end position of the internal part 5, shown in FIG. 1 and FIG. 3 the diaphragm 2 is enclosed by the casing 8, a supporting wall 32 forming part of the housing, and the piston rod 33 and is thus supported against over-stretching.

In FIG. 1, if the downwardly directed force produced on the sleeve 10 by the pressure in the chamber 11 exceeds the force of the spring 12, the control sleeve 10 is passed with a sealing action onto a shoulder 34 of the casing 8.

The rolling diaphragm sealing device operates as described hereinafter.

Before starting operations, the chambers 11, 25 and 26 are filled with lubricating oil without forming air bubbles, and in fact with a slight positive pressure which subjects diaphragms 1 and 2 to preload but stretches them to only an unimportant extent. Then if the diaphragm 1 is subjected at its outer surface to the action of a medium under high pressure, the same pressure is set up in the chamber 26. This pressure tends to displace the oil from the chamber 26 into the chamber 25 and thence into the chamber 11. If the internal part 5 is not yet reciprocating, the pressure gradually rises in the chambers 25 and 11, owing to the leakage by way of the sliding seals 17 and 21, to the value which prevails in the chamber 26, and if the internal part 5 is not in its lower end position the diaphragm 2 is stretched until it abuts against the relevant wall portions of the items 8, 32 and 33. In the embodiment of FIG. 1, the control sleeve 10 is pressed with a sealing action against the shoulder 34.

When the internal part 5 is reciprocated, the seal 21 operates as the piston and the inlet valve of a pump, whilst the seal 17 acts as the outlet valve of a pump. Liquid is pumped from the chamber 11 by way of the chamber 25 into the chamber 26 until the pressure in the chamber 11 has dropped below the desired value. When this occurs, the duct 15 is opened either by the control sleeve 10 or by the valve 30, so as to prevent further emptying of the chamber 11 and thus a further drop in the pressure in this chamber. But when the pressure in the chamber 11 again rises owing to leakages by way of the seals 17 and 21, the duct 15 is closed and the pumping effect described is resumed.

I claim:

1. In combination,
   an internal part;
   a housing defining a bore receiving said internal part, one of said internal part and said housing being reciprocable relative to the other longitudinally of said bore;
   a first annular rolling sealing diaphragm having external and internal annular edges respectively connected in a fluid-tight manner to said housing and to said internal part;
   a second annular rolling sealing diaphragm spaced from the first diaphragm longitudinally of said bore and having external and internal annular edges respectively connected in a fluid-tight manner to said housing and to said internal part,
   portions of the first diaphragm facing the second diaphragm bounding a first annular chamber for receiving a diaphragm-supporting liquid to support said first diaphragm against a relatively low pressure in said bore;
   pumping means operable by the relative reciprocation between said internal part and said housing to pump liquid from said second chamber to said first chamber to compensate for leakage losses from said first chamber;
   return ducting leading to said second chamber for returning said liquid thereto;
   return flow regulating means arranged to regulate the flow of said liquid through said return ducting; and
   pressure-responsive control means arranged to control said regulating means;
   said housing including surface portions in which said second diaphragm seats in its axially outer end position; and
   said pumping means comprising a mobile annular one-way seal carried by said one of said internal part and said housing at a location intermediate the first and second diaphragms and bearing sealingly and slidably on said other of said internal part and said housing for displacing said liquid, and another annular one-way seal carried by said other of said internal part and said housing at a location intermediate the first and second diaphragms and bearing sealingly on said one of said internal part and said housing and disposed nearer to said first chamber than is said mobile annular one-way seal, portions of said internal part, said housing, said mobile annular one-way seal, and said other annular one-way seal defining a pumping chamber of said pumping means from which said return ducting extends.

2. A combination according to claim 1, wherein said control means comprises an aneroid capsule exposed to the pressure in said second chamber so as to commence said flow of said liquid through said return ducting on the pressure in said second chamber falling below a desired value and to terminate said flow of said liquid through said return ducting on the pressure in said second chamber rising to said desired value.

3. A combination according to claim 1, wherein said pressure responsive control means comprises portions of a mobile control member exposed to the pressure in said second chamber, and biassing means acting on said control member in opposition to the pressure in said second chamber, and wherein said regulating means comprises a valve port in communication with said return ducting, and other portions of said mobile control member for closing said valve port.

4. A combination according to claim 3, wherein said control member encircles said second diaphragm, and the external annular edge of said second diaphragm is secured thereto.

5. A combination according to claim 4, wherein said housing includes a casing co-axial with said bore, the internal surface of said casing is formed co-axially with a shoulder, and said control member seats sealingly on said shoulder when the pressure in said second chamber is below said desired value.

6. A combination according to claim 3, wherein said return ducting includes a passage which extends through said control member and which co-operates with said valve port, and said regulating means includes a sealing ring encircling said valve port and arranged to be pressed sealingly against said control member by the pressure in said pumping chamber.

7. A combination according to claim 6, wherein said regulating means includes an O-ring which is substantially co-axial with said sealing ring and presses said sealing ring against said control member, said housing comprising a casing formed with a recess receiving said O-ring and said sealing ring.

* * * * *